United States Patent
Ishinabe et al.

(10) Patent No.: US 6,894,767 B2
(45) Date of Patent: May 17, 2005

(54) LIGHT WAVE DISTANCE-MEASURING SYSTEM

(75) Inventors: Ikuo Ishinabe, Tokyo-to (JP); Jun-ichi Kodaira, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 10/633,967

(22) Filed: Aug. 4, 2003

(65) Prior Publication Data

US 2004/0027554 A1 Feb. 12, 2004

(30) Foreign Application Priority Data

Aug. 8, 2002 (JP) ........................................ 2002-231662

(51) Int. Cl.[7] ................................................. G01C 3/08
(52) U.S. Cl. ........................ 356/5.01; 356/5.09; 356/5.1
(58) Field of Search ................ 356/5.01–5.15

(56) References Cited

U.S. PATENT DOCUMENTS

| | | | | |
|---|---|---|---|---|
| 3,787,118 A | * | 1/1974 | Nowicki et al. | ........... 356/5.12 |
| 4,843,228 A | * | 6/1989 | Nakamura | ................ 250/201.4 |
| 5,815,251 A | | 9/1998 | Ehbets et al. | ............... 356/5.01 |
| 6,396,571 B2 | | 5/2002 | Ohtomo et al. | ............... 356/5.1 |
| 6,411,371 B1 | * | 6/2002 | Hinderling et al. | ......... 356/4.01 |
| 6,545,749 B1 | * | 4/2003 | Andersson | .................. 356/5.01 |

FOREIGN PATENT DOCUMENTS

JP      2000-187076      7/2000

* cited by examiner

*Primary Examiner*—Thomas H. Tarcza
*Assistant Examiner*—Brian Andrea
(74) *Attorney, Agent, or Firm*—Nields & Lemack

(57) ABSTRACT

A light wave distance-measuring system, comprising a projection optical system having an optical axis of outgoing light and for projecting a measuring light, and a photodetection optical system having an optical axis of a returning light and for receiving a reflection light, wherein the photodetection optical system comprises a light receiving lens for receiving and for converging the reflection light, a light receiving surface where the reflection light enters, and a ring-like perforated multi-focal optical member arranged between the light receiving surface and the light receiving lens and for converging the light to the light receiving surface.

5 Claims, 5 Drawing Sheets

LIGHT WAVE DISTANCE-MEASURING SYSTEM

BACKGROUND OF THE INVENTION

The present invention relates to a portable type light wave distance-measuring system of handy design. In particular, the invention relates to a light wave distance-measuring system for measuring a distance up to short-distance range by receiving a retroreflection diffusion light from a commonly used material such as a wall.

In recent years, a portable type distance-measuring system has been produced and marketed, which is provided with light wave distance-measuring function of non-prism type without using a reflection prism.

For instance, a portable type distance-measuring system is disclosed in Japanese Patent Gazette No.JP-A-2000-187076. In this system, collimation is not performed as in a surveying instrument of total station type. Using a distance-measuring visible light as a pointer, an arbitrary measuring point is specified, and a distance is measured. This system comprises a projection optical system for projecting a distance-measuring light and a photodetection optical system for receiving an incident reflected measuring light, both optical systems being arranged in parallel.

When an object to be measured is at a distance of several meters or more, a distance between an optical axis of the projection optical system and an optical axis of the photodetection optical system is short. As a result, the reflected measuring light diffused and reflected by the object to be measured enters and is received by the photodetection optical system as light beams running approximately in parallel to each other.

As a distance-measuring system of similar type, a distance-measuring system comprising optical systems in different arrangement is known. In this system, the projection optical system and the photodetection system are arranged coaxially, and the optical systems are partially used for common purpose. A measuring light is guided toward a reflection mirror arranged on an optical axis and is projected by the reflection mirror. The distance-measuring light is reflected by the object to be measured, and enters through a portion of the optical system where the reflection mirror does not block and is received.

When a distance is measured at near distance by a distance-measuring system, in which an optical axis of a projection optical system is arranged in parallel to an optical axis of a photodetection optical system, an image-forming position is deviated in a backward direction because the measuring distance to an object to be measured is short, and the image-forming position is also deviated from the optical axis of the photodetection system. When the measuring distance is short, the reflection light is strong, and measurement can be made even when the focusing position is deviated in the backward direction. However, light cannot be received when the image-forming position is deviated from the optical axis, and measurement cannot be made. In JP-A-2000-187076, a system is composed so that a photodetection unit can be moved to a position where light can be received or a system is composed so as to be provided with an optical auxiliary member to guide the reflected measuring light at near distance toward the photodetection unit. When the photodetection unit is designed as movable, a structure with high mechanical accuracy is required, and this leads to higher manufacturing cost of the system. When the optical auxiliary member is provided, the amount of receiving light is not sufficient, and a range of measurement is limited to a fixed range.

When the projection optical system is arranged coaxially with the photodetection optical system, the reflection light is not deviated from the incident optical axis even at near distance. However, the reflection light of the portion consistent with the optical axis is blocked by the reflection mirror. Because the image-forming position is deviated in the backward direction, there is such problem that the light is not received on the photodetection unit, and measurement cannot be made. In case of coaxial arrangement, the same means can be applied as in the case of parallel arrangement, but the range of measurement is limited to a fixed range.

SUMMARY OF THE INVENTION

It is an object of the present invention to provide a light wave distance-measuring system, in which an optical axis of an outgoing light is consistent with an optical axis of a returning light, sufficient amount of receiving light can be obtained for measurement at near distance as well as for measurement at long distance, and a distance can be measured in stable manner.

To attain the above object, the light wave distance-measuring system according to the present invention comprises a projection optical system having an optical axis of outgoing light and for projecting a measuring light, and a photodetection optical system having an optical axis of a returning light and for receiving a reflection light, wherein the photodetection optical system comprises a light receiving lens for receiving and for converging the reflection light, a light receiving surface where the reflection light enters, and a ring-like perforated multi-focal optical member arranged between the light receiving surface and the light receiving lens and for converging the light to the light receiving surface. Also, the present invention provides the light wave distance-measuring system as described above, wherein the light receiving lens is a perforated lens, and an aperture is positioned on an optical axis of the outgoing light. Further, the present invention provides the light wave distance-measuring system as described above, wherein the perforated multi-focal optical member is a toric lens having at least two focal points. Also, the present invention provides the light wave distance-measuring system as described above, wherein the perforated multi-focal optical member is an aspherical lens. Further, the present invention provides the light wave distance-measuring system as described above, wherein the perforated multi-focal optical member has a cross-section in form of a cone prism. Also, the present invention provides the light wave distance-measuring system as described above, wherein the perforated multi-focal optical member is a cone prism having at least two or more types of vertical angles. Further, the present invention provides the light wave distance-measuring system as described above, wherein the cone prism has a vertical angle continuously changed. Also, the present invention provides the light wave distance-measuring system as described above, wherein an optical axis of the outgoing light is decentered from a center of the light receiving lens.

BRIEF DESCRIPTION OF THE DRAWINGS

FIG. 4(A) is a front view, FIG. 4(B) is a sectional side view, and FIG. 4(C) is a sectional plan view;

FIG. 5(A) is a front view, and FIG. 5(B) is a sectional side view;

FIG. 6(A) is a front view, FIG. 6(B) is a sectional side view, and FIG. 6(C) is a sectional plan view.

DETAILED DESCRIPTION OF THE PREFERRED EMBODIMENTS

Figure 1:
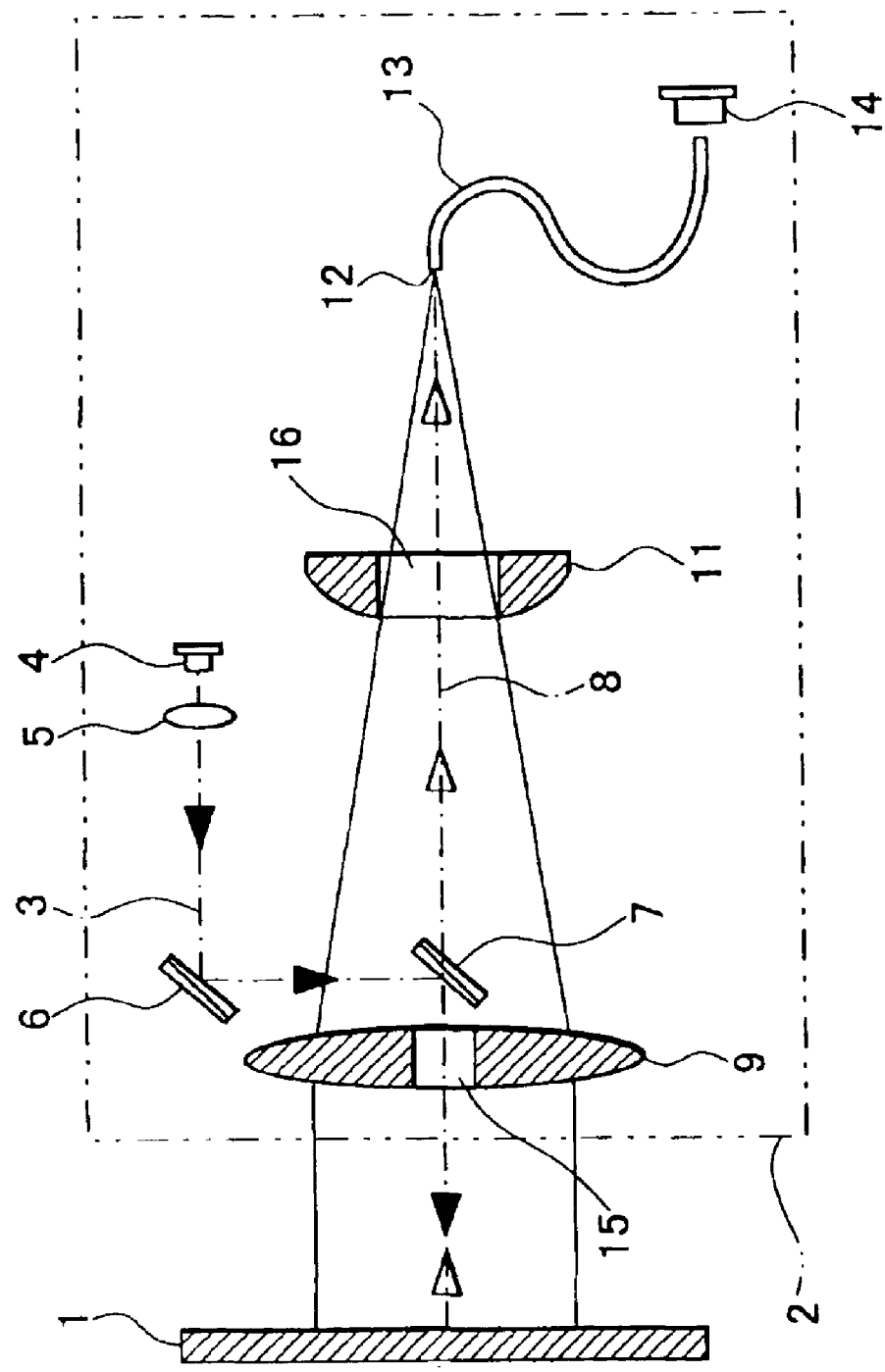
FIG. 1 is a schematical drawing to show a first embodiment of the present invention.

Description will be given below on embodiments of the present invention referring to the drawings.

FIG. 1 shows a first embodiment of the present invention. In the figure, reference numeral 1 denotes an object reflector representing a commonly used material such as a wall, which is to be an object for measurement, and 2 represents a light wave distance-measuring system.

Now, description will be given on the light wave distance-measuring system 2.

On an optical axis 3 of an outgoing light beam, a light source 4 for emitting a visible laser beam, a condenser lens 5, and a first mirror 6 are arranged. A second mirror 7 is arranged at a position opposite to the first mirror 6. The laser beam emitted from the light source 4 is turned to a parallel beam by the condenser lens 5. After being reflected by the first mirror 6 and the second mirror 7, the laser beam passes through an aperture 15 of a light receiving lens 9 and is projected toward the object reflector 1. The condenser lens 5, the first mirror 6, the second mirror 7, etc. make up together a projection optical system.

On an optical axis 8 of a returning light, a light receiving lens 9, a perforated light converging lens 11, and a light receiving end surface 12 of an optical fiber 13 are arranged. The light receiving end surface 12 is at a focal position of the light receiving lens 9. A photodetection element 14 is arranged at a position facing to an exit end surface of the optical fiber 13. The perforated light converging lens 11 is positioned between the light receiving lens 9 and the light receiving end surface 12. The light receiving lens 9, the perforated light converging lens 11, the optical fiber 13, etc. make up together a photodetection optical system.

The optical axis 3 of the outgoing light directed from the light wave distance-measuring system 2 to the object reflector 1 is aligned with the optical axis 8 of the returning light directed from the reflector 1 toward the light wave distance-measuring system 2.

First, description will be given on a case where the object reflector 1 is at long distance.

The laser beam emitted from the light source 4 is deflected by the first mirror 6 and the second mirror 7. Then, the laser beam passes through the aperture 15 formed at the center of the light receiving lens 9 and is projected toward the object reflector 1. The laser beam is reflected in diffuse reflection by the object reflector 1. From the infinity with the reflection surface of the object reflector 1 acting as a secondary light source, a reflection light enters the light wave distance-measuring system 2. The reflection light enters the light receiving lens 9 as a spread-out luminous flux of parallel beam and the reflection light is converged to the light receiving end surface 12 by the light receiving lens 9. The aperture 15 may be filled by a transparent material having no refractive power.

After entering the light receiving lens 9, approximately all of light components of the reflection light pass through an aperture 16 formed at the center of the perforated light converging lens 11 without being blocked by the perforated light converging lens 11, and the light is converged to the light receiving end surface 12. A sufficient light amount as required for distance measurement is guided toward the optical fiber 13 of the photodetection unit and enters the photodetection element 14 through the optical fiber 13.

Next, description will be given on a case where the object reflector 1 is at near distance referring to FIG. 2.

When the object reflector 1 is at near distance (i.e. when the object reflector 1 is not at the infinity), a light converging position 12' of the reflection light by the light receiving lens 9 is deviated to a position more backward than the light receiving end surface 12.

For this reason, among the reflection light components, the luminous flux of the reflection light entering the aperture 15 are not converged by the light receiving lens 9, and are blocked by the second mirror 7. If we review a condition of the luminous flux of the reflection light when the perforated light converging lens 11 is not provided, the light receiving end surface 12 is positioned at a point where the light is blocked by the aperture 15 and the second mirror 7. Therefore, the reflection light converged by the light receiving lens 9 does not enter the light receiving end surface 12.

Next, description will be given on operation of the perforated light converging lens 11.

Under the condition where the perforated light converging lens 11 is integrated, a luminous flux in a peripheral portion of the reflection light converged by the light receiving lens 9 enters the perforated light converging lens 11, and the luminous flux is converged to the light receiving end surface 12 by the perforated light converging lens 11. Accordingly, the luminous flux in the shaded portion in FIG. 2 enter the photodetection element 14 via the optical fiber 13. The object reflector 1 is at near distance, and light intensity of the reflected light beam is high. Even in the peripheral portion, the light amount sufficient for distance measurement can be obtained.

Figure 2:
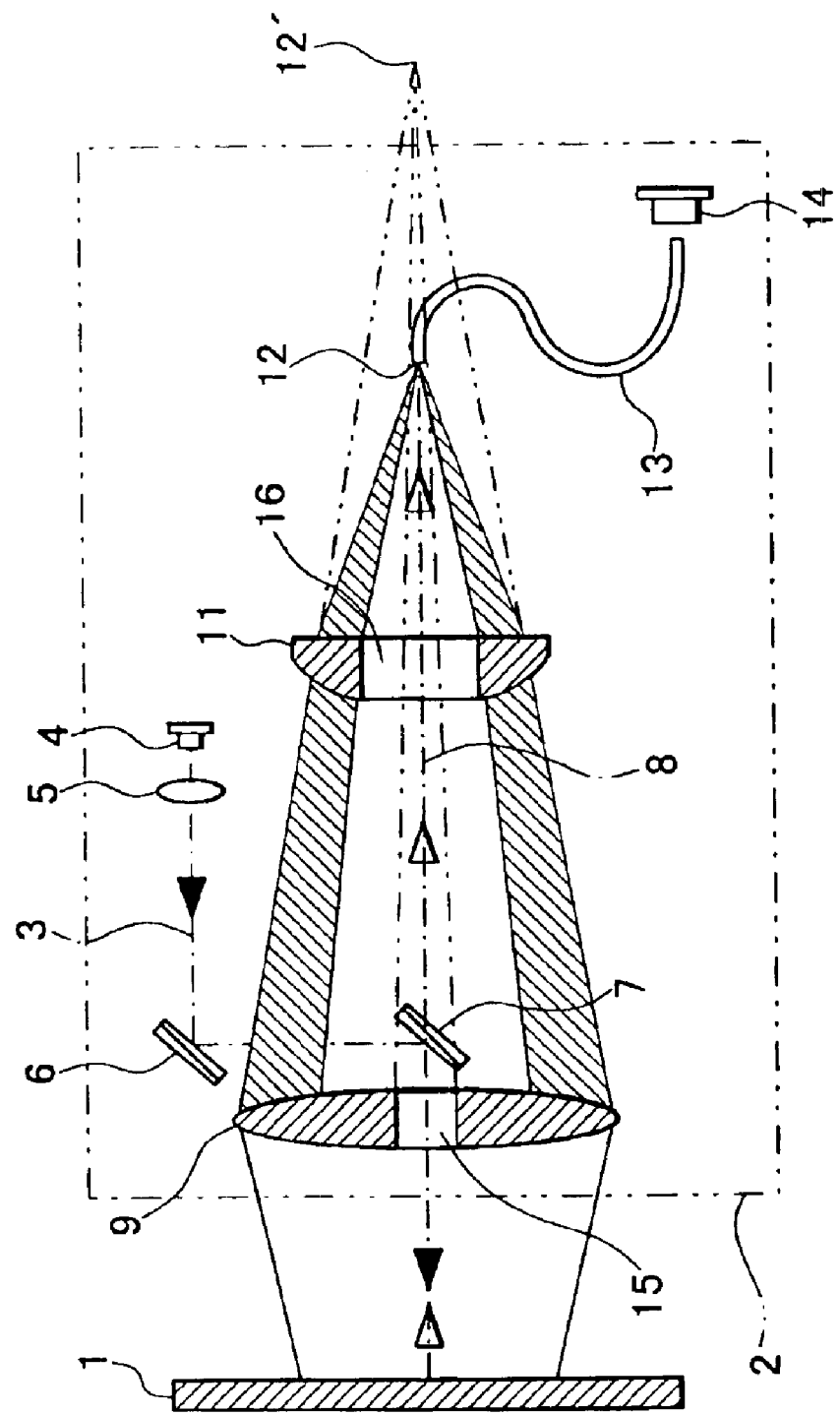
FIG. 2 is a drawing to explain operation of the first embodiment of the present invention.

In an intermediate condition other than the conditions shown in FIG. 1 and FIG. 2, a part of the luminous flux converged by the light receiving lens 9 and a part of the luminous flux converged by the perforated light converging lens 11 enter the light receiving end surface 12 respectively, and a sufficient light amount required for distance measurement can be obtained. The optical fiber 13 may not be used, and the photodetection element 14 may be arranged in such manner that the photodetection surface of the photodetection element 14 is at the position of the light receiving end surface 12.

Figure 3:
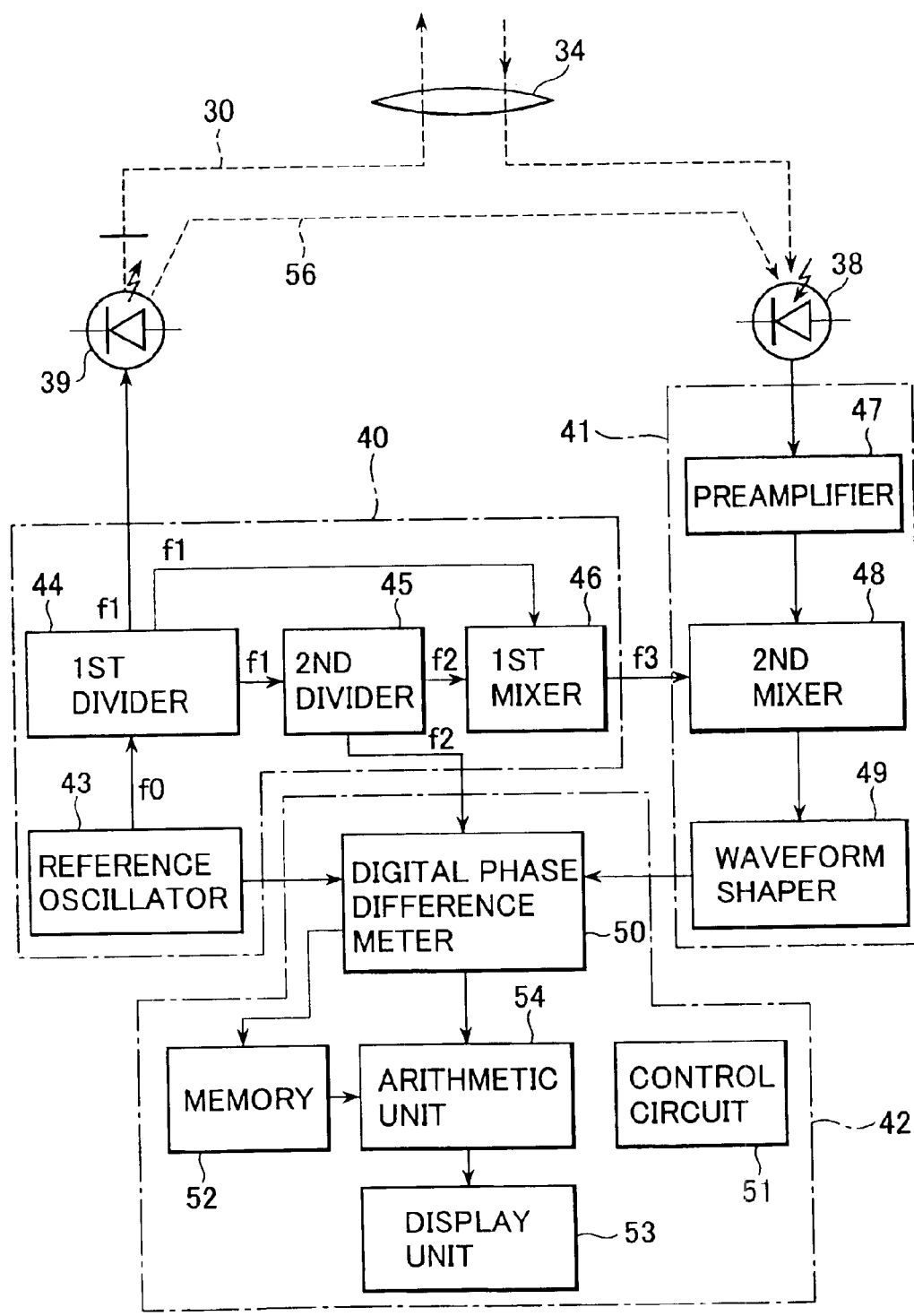
FIG. 3 is a circuit diagram showing an example of a circuit of a light wave distance-measuring device to be applied in the present invention.

FIG. 3 shows an example of a circuit of a light wave distance-measuring device to be applied in the present invention. This light wave distance-measuring device is designed as non-prism distance-measuring type. The non-prism distance-measuring type can be subdivided to pulse type and continuous light phase difference type, etc. The latter is generally used in case of visible light. In the following, description will be given on the phase difference type.

The light wave distance-measuring device comprises a light emission analog circuit 40, a light receiving analog circuit 41, and a digital circuit 42. The light emission analog circuit 40 comprises a reference oscillator 43, a first divider 44 for input from the reference oscillator 43 and for output to a light emission element 39 (corresponding to the light source 4 in FIG. 1), a second divider 45 for input from the first divider 44, and a first mixer 46 for input from the first divider 44 and the second divider 45. The light receiving analog circuit 41 comprises a preamplifier 47 for input from the photodetection element 38 (corresponding to the photodetection element 14 in FIG. 1), a second mixer 48 for input from the preamplifier 47 and the first mixer 46, and a waveform shaper 49 for input from the second mixer 48 and for output to the digital circuit 42.

The digital circuit 42 comprises a digital phase difference meter 50 for input from the reference oscillator 43, the second divider 45 and the waveform shaper 49, a memory 52 for input from the digital phase difference meter 50, and an arithmetic unit 54 for input from the digital phase difference meter 50 and the memory 52 and for output to a display unit 53. The digital circuit 42 further comprises a control circuit 51. In the above system configuration, it is desirable that the light receiving analog circuit 41 and the light emission analog circuit 40 are shielded independently from each other. If higher accuracy is required, it is desirable that all blocks shown in FIG. 3 are shielded.

In the above electrical circuits, reference frequency (f0= 30 MHz) from the reference oscillator 43 is divided to 1/20 by the first divider 44, and a signal of f1=1.5 MHz is generated. The signal is sent to the light emission element 39, and the light emission element 39 emits an infrared modulated light of 1.5 MHz. The modulated light from the light emission element 39 is sent to the object reflector 1 arranged at a target point via an objective lens 34, etc. Then, it is reflected by the object reflector 1 and reaches the photodetection element 38 again via the objective lens 34, etc. The light beam entering the photodetection element 38 contain a light component of 1.5 MHz and a phase difference component corresponding to the distance to be measured.

On the other hand, the signal with frequency f1 from the first divider 44 is also supplied to the second divider 45. It is then divided to 1/500, and a signal of f2=3 kHz is generated. This signal is supplied to the first mixer 46, and a signal with frequency f3÷f1−f2=1497 MHz is generated, which is a difference from the f1 signal coming from the first divider 44. The signal with frequency f3 is further supplied to the second mixer 48 of the light receiving analog circuit 41. The second mixer 48 generates a beatdown signal from f1−f3=f2 between the output signals supplied from the preamplifier 47.

The signal from the photodetection element 38 has the phase difference component corresponding to the distance to be measured. Thus, the output signal of the second mixer 48 contains a phase difference corresponding to the signal of f2=3 kHz and the distance. After a waveform of this signal is shaped by the waveform shaper 49, this signal is supplied to the digital phase difference meter 50 of the digital circuit 42. The signal with frequency f2 from the second divider 45 is sent to the digital phase difference meter 50 as a reference signal. The phase difference corresponding to the distance to be measured is detected. The phase difference thus detected is digitally measured by a signal with frequency f0 from the reference oscillator 43, and this value is supplied to the arithmetic unit 54 as a distance-measuring data. Based on the distance-measuring data, the arithmetic unit 54 performs such required calculation as calculating the distance to the object reflector 1 based on the distance-measuring data and also calculating the distance between two points and area of a designated range based on the distance-measuring data at two points. In FIG. 3, reference numeral 30 denotes a light beam on an outgoing route, and 56 represents a circular reference light.

Figure 4:
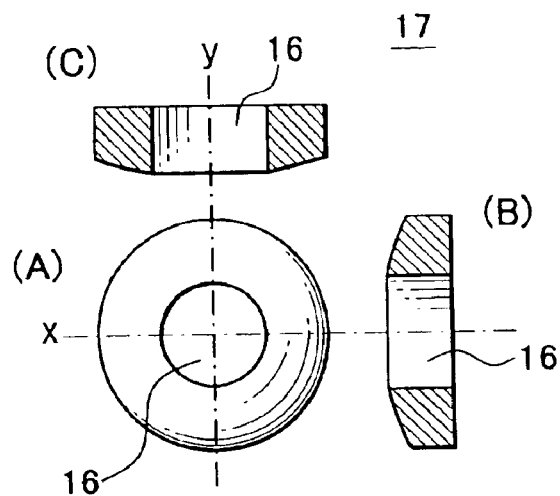
FIG. 4 is a drawing to explain a perforated light converging optical member to be used in a second embodiment of the present invention.

FIG. 4 shows a second embodiment of the invention. In this second embodiment, a ring-like toric lens 17 is used instead of the perforated light converging lens 11. The toric lens 17 has variable curvatures, and a curvature on an incident surface of the cross-section perpendicular to an X-axis is different from a curvature on an incident surface of the cross-section perpendicular to a Y-axis.

By the use of the toric lens 17, the reflection light can be converged to the light receiving end surface 12 when the object reflector 1 is at near distance. Because light converging positions of the reflection light are different according to an X-axis direction and a Y-axis direction, the reflection light can be converged to the light receiving end surface 12 effectively within a wide range in condition that the object reflector 1 is at near distance.

As a variation of the toric lens 17, which has different focal lengths in the X-axis direction and the Y-axis direction, a lens may be used, which has a focal length continuously varied from an X-axis to a Y-axis, or which has a focal length continuously changed at 360°.

Figure 5:
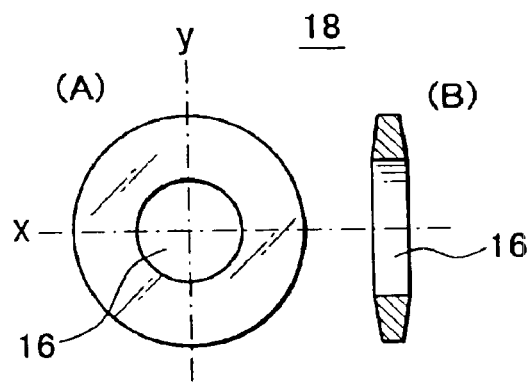
FIG. 5 is a drawing to explain a perforated light converging optical member to be used in a third embodiment of the present invention.

FIG. 5 shows a third embodiment of the invention.

In the third embodiment, a doughnut-like cone prism 18 is used as the light converging optical member, which has the approximate same function as the perforated light converging lens 11. When the cone prism 18 is used, the reflection light can be converged in the same manner as above. The cone prism 18 has a wedge-like cross-section, and has a form of a doughnut continuously arranged in a circular form.

Figure 6:
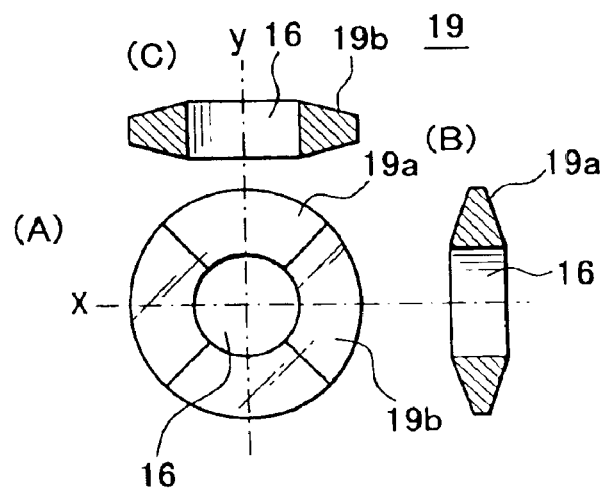
FIG. 6 is a drawing to explain a perforated light converging optical member of a variation of the third embodiment.

FIG. 6 shows a variation of the third embodiment, and it represents a perforated light converging optical member 19, which comprises two types of wedge prisms 19a and 19b with different vertical angles. In this light converging optical member 19, a total circumference is divided into 4 equal portions, and opposed pairs are designed as wedge prisms 19a and 19a as well as wedge prisms 19b and 19b respectively having the same vertical angle. In this variation of the third embodiment, the wedge prism 19a and the wedge prism 19b have different light converging positions. As a result, the use of the perforated light converging optical member 19 widens a range of the distance to the object reflector 1, in which the reflection light can enter the light receiving end surface 12.

The perforated light converging member 19 as given above is designed in circular shape, while wedge prisms in trapezoidal shape may be combined together to form a polygonal shape. Or, it may be designed in such manner that the vertical angle is continuously changed along the circumference of the perforated light converging optical member 19.

Figure 7:
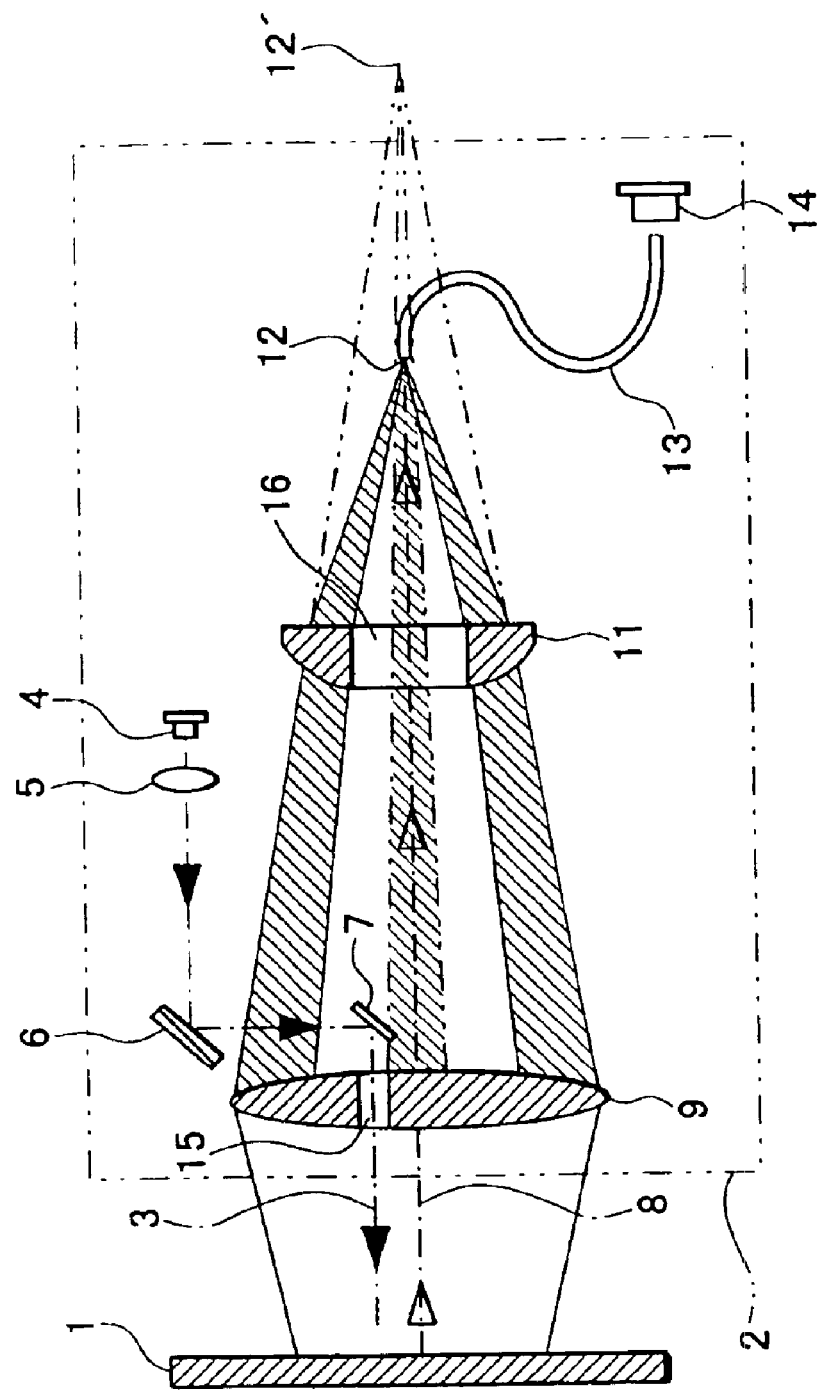
FIG. 7 is a schematical drawing of a fourth embodiment of the present invention.

FIG. 7 shows a fourth embodiment of the invention. The fourth embodiment is the same as the first embodiment shown in FIG. 1 except that an aperture 15 is formed at a position decentered from the center of the light receiving lens 9 so that the laser beam from the light source 4 is projected through the decentered aperture 15, and the optical axis 3 of the outgoing light is separated from the optical axis 8 of the returning light.

FIG. 7 shows a case where the object reflector 1 is at near distance. When the object reflector 1 is at near distance, the light converging position 12' of the reflection light by the light receiving lens 9 is shifted to a position behind the light receiving end surface 12 as shown in FIG. 2. Because the aperture 15 is at a position decentered from the optical axis 8 of the returning light, a lacking portion of the reflection light due to the presence of the aperture 15 is also decentered. Therefore, the luminous flux of the reflection light passing through the central portion of the light receiving lens 9 enters the light receiving end surface 12. The luminous flux on the peripheral portion of the reflection light entering the perforated light converging lens 11 also enters the light receiving end surface 12. In the fourth embodiment, the amount of the receiving light is increased more than in the first embodiment because the luminous flux at the central portion of the reflection light.

The luminous flux passing through the central portion of the light receiving lens 9 always enter the light receiving end surface 12, and the amount of the receiving light is increased for both long distance and near distance.

A distance between the optical axis 3 of the outgoing light and the optical axis 8 of the returning light is very small, and the symmetry with respect to the object reflector 1 is not affected very much.

As the perforated light converging lens 11, one of the perforated light converging members 17, 18 and 19 as shown in FIG. 4-FIG. 6 may be provided with a decentered aperture 16 and used.

The system according to the present invention comprises a projection optical system having an optical axis of outgoing light and for projecting a measuring light, and a photodetection optical system having an optical axis of a returning light and for receiving a reflection light, wherein the photodetection optical system comprises a light receiving lens for receiving and for converging the reflection light, a light receiving surface where the reflection light enters, and a ring-like perforated multi-focal optical member arranged between the light receiving surface and the light receiving lens and for converging the light to the light receiving surface. As a result, when the object reflector is at long distance, the reflection light is converged by the light receiving lens. Then, the light enters the light receiving surface after passing through an aperture on the perforated light converging optical member. When the object reflector is at near distance, the reflection light is converged by the perforated light converging optical member and enters the light receiving surface. Thus, an amount of receiving light can be obtained, which is required for the measurement at long distance and at near distance.

Also, in the system of the present invention, the perforated multi-focal optical member is a toric lens having at least two focal points. Or, the perforated multi-focal optical member is a cone prism having at least two or more types of vertical angles. As a result, even when the position of the object reflector at near distance is changed, the reflection light effectively enters the light receiving surface.

What is claimed is:

1. A light wave distance-measuring system, comprising a projection optical system having an optical axis of outgoing light and for projecting a measuring light, and a photodetection optical system having an optical axis of a returning light and for receiving a reflection light, wherein said photodetection optical system comprises a light receiving lens for receiving and for converging the reflection light, a light receiving surface where the reflection light enters, and a ring-like perforated optical member arranged between said light receiving surface and said light receiving lens and having an aperture, wherein said aperture transmits the reflection light converged by said light receiving lens in case of distance measurement at long distances, and said perforated optical member has multiple focal points for converging the reflection light to said light receiving surface corresponding to a range of near distance in case of distance measurement at near distances.

2. A light wave distance-measuring system according to claim 1, wherein said perforated optical member is a toric lens having at least two focal points.

3. A light wave distance-measuring system according to claim 1, wherein said perforated optical member is an aspherical lens.

4. A light wave distance-measuring system according to claim 1, wherein said perforated optical member has a cross-section in the form of a wedge prism, and said perforated optical member is a cone prism having at least two or more types of vertical angles.

5. A light wave distance-measuring system according to claim 1, wherein said perforated optical member has a cross section in the form of a wedge prism, and said perforated optical member is a cone prism which has a vertical angle continuously changed.

* * * * *